Jan. 21, 1964    R. J. DORN    3,118,672
INFLATING VALVE SEALING MEANS
Filed Dec. 23, 1957

INVENTOR.
RANDOLPH J. DORN
BY
ATTORNEYS

United States Patent Office 3,118,672
Patented Jan. 21, 1964

3,118,672
INFLATING VALVE SEALING MEANS
Randolph Jacob Dorn, Sandusky, Ohio, assignor to The Barr Rubber Products Company, Sandusky, Ohio, a corporation of Ohio
Filed Dec. 23, 1957, Ser. No. 704,474
3 Claims. (Cl. 273—58)

The present invention relates to inflatable balls or similar inflatable articles which are provided with a valve structure opening through one portion of the wall of the inflatable article. More particularly, the invention relates to inflatable articles designed to be inflated through the use of an inflating needle.

Heretofore, many varieties of self-sealing valves have been employed in balls and other hollow elastic articles designed to be inflated with an inflating needle. Some prior valves simply consisted of an internal rubber or elastic plug structure fixed to the internal wall of the ball. To inflate, the wall and plug are punctured by a hollow inflating needle. When inflation is completed, the needle is withdrawn from the plug and the resilience of the material is supposed to seal the puncture. In practice, however, the sealing of the puncture is not always complete and it is necessary to reject a considerable number of otherwise satisfactory articles because of leaking.

Efforts to reduce leaking led to a wide variety of modifications of the basic self-sealing plug. For example, sealing agents are applied to the opening immediately after withdrawal of the needle. Some of the sealing agents employed are heat, solvents, patches or combinations thereof. Although these sealing agents reduce the leaking, the addition of the sealing step greatly complicates the manufacturing process. Modifications of the valve construction itself also have been suggested, such as the incorporation of a pocket of fluid in the valve so that the fluid will run into the needle opening when the needle is removed and seal the opening. However, all of the modifications require either additional manual operations or equipment and thereby increase manufacturing costs.

An object of the present invention is to provide a rugged, durable, inflatable article which is inexpensive and which has a valve means which is simple and foolproof in operation.

A further object of the invention is to provide a self-sealing valve which has superior initial air retention and an unusually long service life.

These and other objects and advantages of the invention will be understood more fully from the following description and the accompanying drawing, in which.

Figure 1:
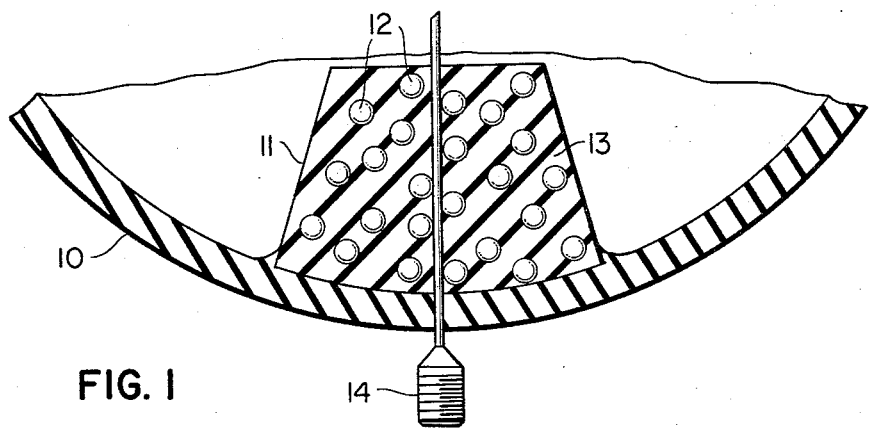
FIGURE 1 is a schematic, sectional view of a sealing plug embodying the invention, with an inflating needle inserted.
Figure 2:
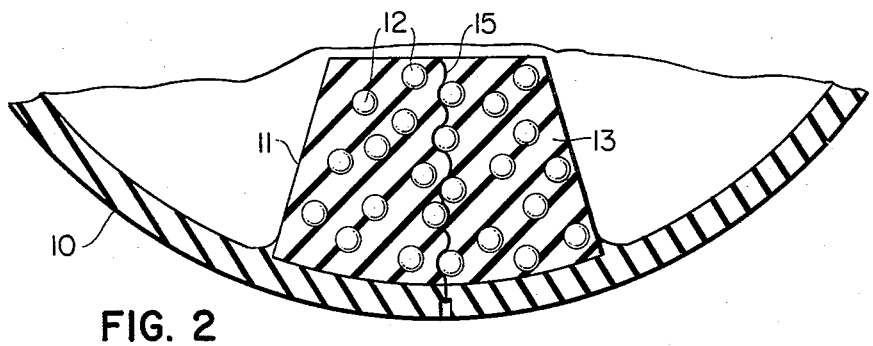
FIGURE 2 is a sectional view of the sealing plug after the inflating needle is withdrawn.

The sealing plug in FIGURES 1 and 2 is mounted on the inside of an air envelope 10 and is vulcanized or otherwise appropriately fixed thereto. The plug 11 is made from a heterogeneous mixture of materials having different degrees of hardness. The shape of the plug is a matter of choice and may be cylindrical, cubical, conical, pyramidal, etc., with the exact shape not being important.

In the drawing, plug 11 is composed of a discontinuous phase 12 dispersed in a continuous phase 13. The discontinuous phase 12 may be either harder or softer than the surrounding material 13. Advantageously, the discontinuous phase, e.g., particles, is composed of a harder material, such as small metal pieces or balls, e.g., BB shot, etc., or other granular materials, e.g., sand, etc.

The discontinuous phase also may be a plastic material, for example, thermoplastic resins, e.g., polystyrene, polyvinyls, polyesters, polyamides; thermosetting resins, e.g., phenolformaldehydes, melamines, alkyds; and the like. The plastic material used may have a chemical composition either the same as or different from the surrounding material. When the particles 12 are of the same chemical composition as the surrounding material 13, such as when polyvinyl plastisols are used, it is understood, as stated above, that the particles 12 will have a different degree of hardness than the surrounding material 13, e.g., either harder or softer, depending upon the particular construction desired. This may be accomplished by using plastic materials of different molecular weights, degree of cure, etc. However, since the sealing plug itself must be plastic and resilient, the material surrounding the particles must be an elastic and resilient material whether the particles are soft and elastic or hard and non-resilient.

Although the mechanism by which the heterogeneous plugs of the present invention improve air-retention is not actually known, the following is a possible explanation of the action taking place. Since the plug is elastic and resilient, the point of inflating needle 14 will deflect the harder particles 12 from its path as it passes through the plug. When the needle is withdrawn as in FIGURE 2, the return of the particles 12 to their original positions will result in pinching of the passage. Thus, a cross-section through the plug after the needle is withdrawn, as in FIGURE 2, would reveal a tortuous, twisting passage 15 rather than a direct, straight-line passage with the portions of the harder material pinching shut the opening left by the needle.

Figure 3:
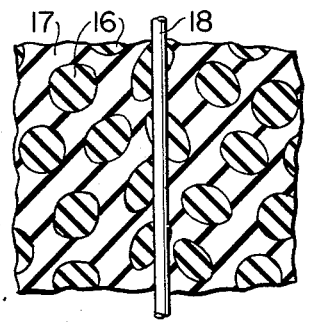
FIGURE 3 is an enlarged, schematic, sectional view of a portion of a sealing plug illustrating another embodiment of the invention, with an inflating needle inserted.
Figure 4:
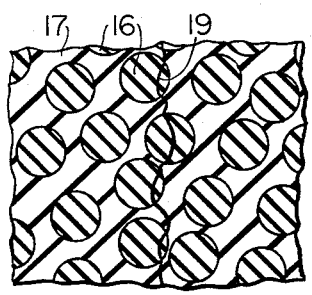
FIGURE 4 is an enlarged, schematic, sectional view of the sealing plug after the inflating needle is withdrawn.

When discontinuous phase 16 is softer than surrounding material 17, as shown in FIGURE 3, the passing of needle 18 through the plug will cause a distortion of the phases with the softer particles 16 being distorted more than the surrounding material 17. If the softer particles were originally spheres, the insertion of the needle may distort the spheres into ellipsoid shapes. After the needle is withdrawn, as shown in FIGURE 4, the softer particles 16 return to substantially their original shape and position in the plug and the surrounding material also being elastic and resilient but to a lesser degree, will return to its original configuration. This realignment of the phases will create a tortuous and twisting passage 19 somewhat similar to that created when the particles are harder than the surrounding material with the passage being tightly pinched at the interface of the phases.

The heterogeneous plugs of the present invention may be made by any of the known plug-making methods, e.g., molding or casting a layer of material and after setting cutting into suitable shapes for the individual plugs. The heterogeneous material for use in making the plugs of the present invention may be prepared, for example, by mixing a suitable elastic, resilient material with particles of greater hardness. The elastic material may be a material similar to one of those used for the walls of the inflated object itself, for example, a resin with a non-volatile plasticizer, such as a polyvinyl plastisol of the following formulation:

| | Parts by weight |
|---|---|
| High molecular weight polyvinyl chloride in the form of a fine white powder, specific gravity approx. 1.4 | 60 |
| Polyvinylchloride acetate copolymer, 96%+vinyl chloride, less than 4% vinyl acetate | 13⅓ |
| Triethylene glycol di(2-ethyl hexoate) | 13⅓ |
| Dioctyl phthalate | 13⅓ |
| Cadmium naphthenate dissolved in plasticizer type carrier, approx. 1:1 (stabilizer) | 2 |
| Titanox (color) | 3 |

The hard particles, such as small pieces of cured polyvinyl plastisol or other similar material mentioned above, are mixed with the above formulation until a uniform dispersion is formed, and this dispersion is cast or molded to form the plug shapes.

The heterogeneous plugs of the present invention may be incorporated in balls and other similar inflated objects made by any of the conventional forming methods. One method of making balls involves the use of a spherical, two-piece mold in which a previously formed plug is placed on a pin or a similar mounting device located in the mold wall. A quantity of material suitable for the making of balls, e.g., the polyvinyl plastisol formulation above, is placed in the mold and the mold halves fastened together. The mold is then rotated around several axes of rotation to distribute the mix evenly around the inside surface of the mold. A certain amount of the plastic material adheres to the plug and thus secures the plug to the wall of the ball.

The rotating mold is then heated to a temperature of about 165° C., to set and fuse the wall material in the conformation of the mold and to partially fuse the plug to the wall. The cast article is then stripped from the mold and allowed to cool.

Thus, it will be seen that the heterogeneous sealing plugs of the present invention not only provide initial air retention superior to that of the plugs produced heretofore, but also have a longer usable life and, in addition, are simple to manufacture and to incorporate into the inflatable articles. As a result, the plugs of the present invention reduce manufacturing costs and substantially reduce the number of rejects due to faulty valves.

It will be apparent to one skilled in the art that the present invention is not limited to the specific embodiments described in detail above, but that a number of modifications and variations can be made within the scope of the invention. Accordingly, the scope of the invention is to be restricted only by the following claims.

What is claimed is:

1. A flexible air-inflatable article comprising an air envelope of an elastic, resilient material, a sealing plug projecting within said air envelope inwardly from the wall of said air envelope, the outer wall-adjoining end of said plug being embedded in the wall of said air envelope and being at least partially fused therewith, said plug comprising a heterogeneous mixture of a plurality of particles dispersed in a softer, elastic, resilient material.

2. A flexible air-inflatable article comprising an air envelope of an elastic, resilient material, a sealing plug projecting within said air envelope inwardly from the wall of said air envelope, the outer wall-adjoining end of said plug being embedded in the wall of said air envelope and being at least partially fused therewith, said plug comprising a heterogeneous mixture of a plurality of soft, resilient particles dispersed in an elastic, resilient material less soft than said particles.

3. A flexible air-inflatable cast article comprising an air envelope consisting essentially of a resin and a non-volatile plasticizer therefor, a sealing plug projecting within said air envelope inwardly from the wall of said air envelope, the outer wall-adjoining end of said plug being embedded in the wall of said air envelope and being at least partially fused therewith, said plug comprising a heterogeneous mixture of a plurality of solid particles dispersed in a softer, elastic, resilient material comprising a resin and a non-volatile plasticizer therefor.

References Cited in the file of this patent

UNITED STATES PATENTS

| 1,974,378 | Nicoll | Sept. 18, 1934 |
| 2,233,096 | Goldsmith | Feb. 25, 1941 |
| 2,477,899 | Rempel | Aug. 2, 1949 |
| 2,760,775 | Tipton | Aug. 28, 1956 |
| 2,830,610 | Chupa | Apr. 15, 1958 |

FOREIGN PATENTS

| 281,431 | Germany | Jan. 5, 1915 |